(12) United States Patent
Takagi et al.

(10) Patent No.: US 6,718,799 B2
(45) Date of Patent: Apr. 13, 2004

(54) DIE AND GLASS MATERIAL FOR FORMING GLASS SUBSTRATE, METHOD FOR MANUFACTURING GLASS SUBSTRATE, AND MAGNETIC DISK GLASS SUBSTRATE

(75) Inventors: Kazuaki Takagi, Osaka (JP); Kunio Hibino, Hirakata (JP); Tomokazu Tokunaga, Sasayama (JP); Fujio Okuyama, Kaminoyama (JP); Minoru Onoda, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/358,468

(22) Filed: Feb. 4, 2003

(65) Prior Publication Data

US 2003/0121286 A1 Jul. 3, 2003

Related U.S. Application Data

(62) Division of application No. 09/719,695, filed as application No. PCT/JP00/02811 on Apr. 27, 2000, now Pat. No. 6,539,750.

(30) Foreign Application Priority Data

Apr. 30, 1999 (JP) ............................................ 11-124452

(51) Int. Cl.⁷ .......................... C03B 11/16; C03B 11/12
(52) U.S. Cl. .............................. 65/322; 65/275; 65/318
(58) Field of Search ............................... 428/64.2–65.9; 65/275, 305, 318, 322, 355, 374.1, 374.11, 374.13

(56) References Cited

U.S. PATENT DOCUMENTS

| 4,836,840 A | 6/1989 | Hirota et al. |
|---|---|---|
| 5,013,348 A | 5/1991 | Hirota |
| 5,125,945 A | 6/1992 | Menihan et al. |
| 5,173,100 A | 12/1992 | Shigyo et al. |
| 5,762,676 A | 6/1998 | Richards et al. |
| 5,770,294 A * | 6/1998 | Sakamoto .................. 428/64.1 |
| 5,817,161 A | 10/1998 | Takagi et al. |
| 5,938,807 A | 8/1999 | Komiyama et al. |
| 6,306,786 B1 * | 10/2001 | Koyama et al. ............... 501/69 |

FOREIGN PATENT DOCUMENTS

| JP | 62-252331 | 11/1987 |
|---|---|---|
| JP | 63-79727 | 4/1988 |
| JP | 64-79023 | 3/1989 |
| JP | 1-176237 | 7/1989 |
| JP | 2-26843 | 1/1990 |
| JP | 6-271323 | 9/1994 |
| JP | 7-215721 | 8/1995 |
| WO | 00/66504 | * 11/2000 |

* cited by examiner

Primary Examiner—Sean Vincent
(74) Attorney, Agent, or Firm—Merchant & Gould, P.C.

(57) ABSTRACT

A glass material (4) is placed in a forming die including a pair of upper and lower dies (1, 2) and a control member (3) for controlling the space between the upper and the lower die, and then heated, softened, and molded by pressure into a glass substrate in the shape of a parallel plate. The amount of thermal contraction of the control member is smaller than that of the glass material. Therefore, the glass substrate is released from the die when cooled after molding. The present invention can provide a glass substrate that is excellent in smoothness and form accuracy of the surface, and that is suitable for recording media such as magnetic disks that are inexpensive and suitable for mass production.

3 Claims, 6 Drawing Sheets

DIE AND GLASS MATERIAL FOR FORMING GLASS SUBSTRATE, METHOD FOR MANUFACTURING GLASS SUBSTRATE, AND MAGNETIC DISK GLASS SUBSTRATE

This application is a divisional of application Ser. No. 09/719,695, filed Dec. 14, 2000 now U.S. Pat. No. 6,539,750, which is a 371 of PCT/JP00/02811, filed Apr. 27, 2000, which application(s) are incorporated herein by reference.

TECHNICAL FIELD

The present invention relates to a method for producing magnetic disk glass substrates suitable for recording media such as magnetic disks in large quantities and at a low price.

BACKGROUND ART

In the field of magnetic recording, particularly in magnetic disks, high performance, such as miniaturization, reduction in thickness, and high capacity has been proceeding recently, and the need for a magnetic recording medium with high density is increasing. Under such circumstances, there is much research on glass substrates because they are excellent in rigidity and hardness, easily smoothed, and extremely advantageous in increasing density and reliability.

Conventionally, glass substrates for magnetic disks were cut into predetermined sizes and polished to obtain smooth surfaces. However, in recent years, a substrate surface with super-smoothness has been demanded, and technically difficult high precision has been required in a polishing process. Therefore, polishing such substrates one by one is disadvantageous because it results in a large number of processes and an increase in the cost.

In a press molding method, a glass material is heated, molded, and cooled so that the molding face of a die is transferred to the glass material. Since this method does not require subsequent processes, it is inexpensive and provides high productivity and high quality. Therefore, the press molding method has been studied widely in the field of manufacturing optical elements and put into practical use.

However, there are different problems between forming a glass substrate having a small thickness, a large outer diameter, and a large ratio of outer diameter to thickness and forming an optical element having a relatively small ratio of outer diameter to lens thickness and a curvature.

For example, JP 1-176237 A discloses a molding method using a lens forming apparatus that includes a sleeve, a lens surface forming die sidably fitting into the sleeve, and a sleeve holder for holding the circumference of the sleeve. The method is characterized in that the amount of thermal contraction of the sleeve is smaller than that of a lens material, and the amount of thermal contraction of the sleeve holder is larger than that of the lens material.

The use of this apparatus allows a molded glass lens with a desired thickness to be obtained by specifying the thickness of the sleeve holder. Furthermore, since the amount of thermal contraction of the sleeve holder is larger than that of the lens material, pressure from an upper die always is applied to a lens during cooling, so that the lens with a surface of a desired shape can be obtained.

However, in forming such a thin glass substrate that the relationship between an outer diameter X and a thickness Y satisfies X>40 Y, when a glass material is cooled under pressure of an upper die as described above, the glass material adheres to the upper and lower die and cannot be released. In recent years, the demand for the super smooth surface of a glass substrate has been especially high, and the smoother the transferring face of a die becomes, the more likely that adhesion of the glass material occurs.

For example, JP 2-26843 A discloses a method using a thin glass preform material in order to form a molded glass product having a large outer diameter and a small thickness. Since the glass preform material has the shape close to that of the molded glass product, the material is heated easily and transformed a bit. Therefore, this method can shorten a molding cycle easily.

However, when a glass substrate in the shape of a parallel plate is formed using a glass material having the above shape, in placing the glass material on a forming die, air enters the gap between the glass material and the forming die. The air cannot be removed completely even after molding, so that bubbles are generated in the glass substrate. This tendency also increases as the surface of a glass substrate becomes smoother.

DISCLOSURE OF INVENTION

It is an object of the present invention to provide a magnetic disk glass substrate with a super smooth surface that can overcome the above disadvantages of the conventional techniques and can be manufactured by press molding. It is a further object of the present invention to provide a glass substrate forming die, a glass material to be molded into a glass substrate, and a method for manufacturing a glass substrate, by which the magnetic disk glass substrate can be obtained.

A glass substrate forming die of the present invention includes a pair of upper and lower dies and a control member for controlling the space between the upper and the lower die, and is used for manufacturing a glass substrate in the shape of a parallel plate. The amount of thermal contraction of the control member is smaller than that of a material used for the glass substrate. Since the amount of thermal contraction of the control member that controls the space between the upper and the lower die in the thickness direction is smaller than that of the glass substrate material, the upper surface and/or the lower surface of the glass substrate are released from the die when cooled after molding. Therefore, a glass substrate with a super smooth surface in which the diameter is large relative to the thickness can be manufactured easily.

Materials for the control member having the amount of thermal contraction smaller than that of the glass substrate material vary depending on a glass material to be used; examples of appropriate materials are tungsten carbide, alumina, chromium, sapphire, zircon, etc.

The above effect achieved by the forming die of the present invention is remarkable particularly when the die is used for forming such a glass substrate that the relationship between an outer diameter X and a thickness Y satisfies X>40 Y.

It is preferable that the control member of the forming die of the present invention controls the space between the upper and the lower die to be 1 mm or less.

Furthermore, it is preferable that at least one of the upper and the lower die is provided with a concave in the central portion thereof to specify the die used. In addition, a plurality of concaves can increase the number of types of dies to be distinguished.

Next, a glass material to be molded into a glass substrate of the present invention is used for manufacturing a glass substrate in the shape of a parallel plate with a forming die including a pair of upper and lower dies and a control member for controlling the space between the upper and the lower die. The glass material has an amount of thermal contraction larger than that of the control member. The glass material is shaped so that it comes into point-contact with the forming die when placed therein, and as the contact portion between the glass material and the forming die is increased by pressure molding, the glass material is transformed continuously so as to prevent air from entering the contact portion.

A first method for manufacturing a glass substrate of the present invention includes placing a glass material in a forming die including a pair of upper and lower dies and a control member for controlling the space between the upper and the lower die, and molding the glass material into a glass substrate in the shape of a parallel plate by pressure. The amount of thermal contraction of the control member is smaller than that of the glass material. The glass material comes into point-contact with the forming die when placed therein, and as the contact portion between the glass material and the forming die is increased by pressure molding, the glass material is transformed continuously so as to prevent air from entering the contact portion.

The glass material to be molded into a glass substrate and the first method for manufacturing a glass substrate, which are described above, allow the upper surface and/or the lower surface of the glass substrate to be released from a die when cooled after molding. This is because the amount of thermal contraction of the control member that controls the space between the upper and the lower die in the thickness direction is smaller than that of the glass material. Therefore, a glass substrate with a super smooth surface in which the diameter is large relative to the thickness can be manufactured easily.

Furthermore, the glass material comes into point-contact with the die at first, and then is molded in such a manner that the contact area is enlarged so as to prevent air from entering. Therefore, the yield of molding is good, and a glass substrate with high quality can be obtained stably. In order to achieve this, the shape of a glass material, e.g., its vertical cross section, is preferably circular or elliptical.

A second method for manufacturing a glass substrate of the present invention includes a first step of placing a glass material in a forming die including a pair of upper and lower dies and a control member for controlling the space between the upper and the lower die, a second step of heating and softening the glass material, a third step of molding the glass material into a glass substrate in the shape of a parallel plate by pressure, a fourth step of cooling the glass substrate, and a fifth step of taking out the glass substrate. The amount of thermal contraction of the control member is smaller than that of the glass material.

A third method for manufacturing a glass substrate of the present invention includes a first step of placing a glass material on a saucer, a second step of heating and softening the glass material, a third step of placing the glass material, which rests on the saucer, in a forming die including a pair of upper and lower dies and a control member for controlling the space between the upper and the lower die, a fourth step of molding the glass material into a glass substrate in the shape of a parallel plate by pressure, a fifth step of cooling the glass substrate, and a sixth step of taking out the glass substrate. The amount of thermal contraction of the control member is smaller than that of the glass material.

In the second and third manufacturing methods described above, it is preferable that application of pressure is continued until the temperature of the glass substrate reaches at least a glass transition temperature in the cooling process. This allows the form accuracy of a die to be transferred correctly to the glass substrate.

In the first, second, and third manufacturing methods described above, it is preferable that the relationship between an outer diameter X and a thickness Y of the glass substrate satisfies X>40 Y. Moreover, it is preferable that the control member controls the space between the upper and the lower die to be 1 mm or less. It is preferable that at least one of the upper and the lower die is provided with a concave in the central portion thereof, and more preferably, a plurality of concaves are provided.

Furthermore, a glass substrate obtained by the above first, second, and third manufacturing methods is suitable for magnetic disks. In the case of a magnetic disk glass substrate, the glass substrate can contain bubbles that have no effect on the surface of the glass substrate.

As described above, the present invention allows a glass substrate to be obtained that has a desired surface with super-smoothness and is free of waviness by molding using a die without requiring any subsequent processes. Therefore, a magnetic disk glass substrate that is inexpensive and has a stable quality can be obtained.

BEST MODE FOR CARRYING OUT THE INVENTION

Hereinafter, embodiments of the present invention will be described with reference to FIGS. 1 to 6.

Embodiment 1

FIG. 1(A) is a cross-sectional view showing a glass substrate forming die of Embodiment 1 of the present invention, in which a glass material 4 to be molded into a glass substrate is placed.

The glass substrate forming die includes an upper die 1 having a molding face 1a for providing a glass substrate 19 (shown in FIG. 6) with a desired surface roughness, a lower die 2 having a molding face 2a for providing the glass substrate 19 with a desired surface roughness, and a control member 3 for controlling the space between the molding face 1a of the upper die 1 and the molding face 2a of the lower die 2 in completion of molding. The upper die 1 and the lower die 2 are arranged substantially on the same axis so as to face each other. In this case, the appropriate surface roughness (Ra) of the molding faces 1a and 2a is 5 nm or less for magnetic disks, preferably 2 nm or less, more preferably 1 nm or less.

The space varies depending on the thickness of a glass substrate to be formed. However, it is substantially the same as the thickness of a glass substrate, and about 1 mm at the maximum.

Figure 1:
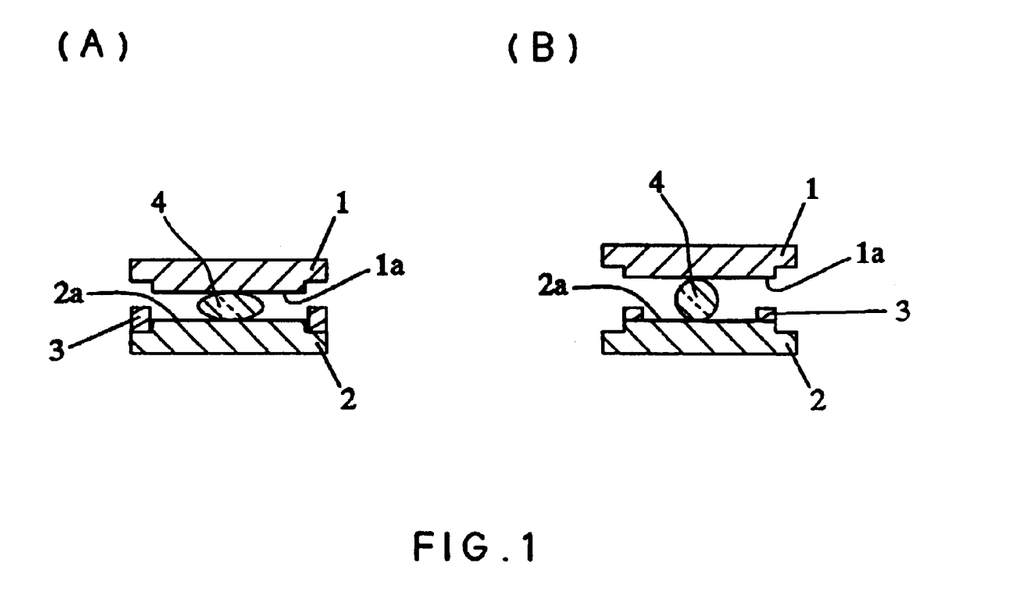
FIG. 1(A) is a cross-sectional view of a glass substrate forming die of Embodiments 1 and 2 of the present invention.
FIG. 1(B) is a cross-sectional view of a glass substrate forming die of Embodiments 3 and 4 of the present invention.
Figure 2:
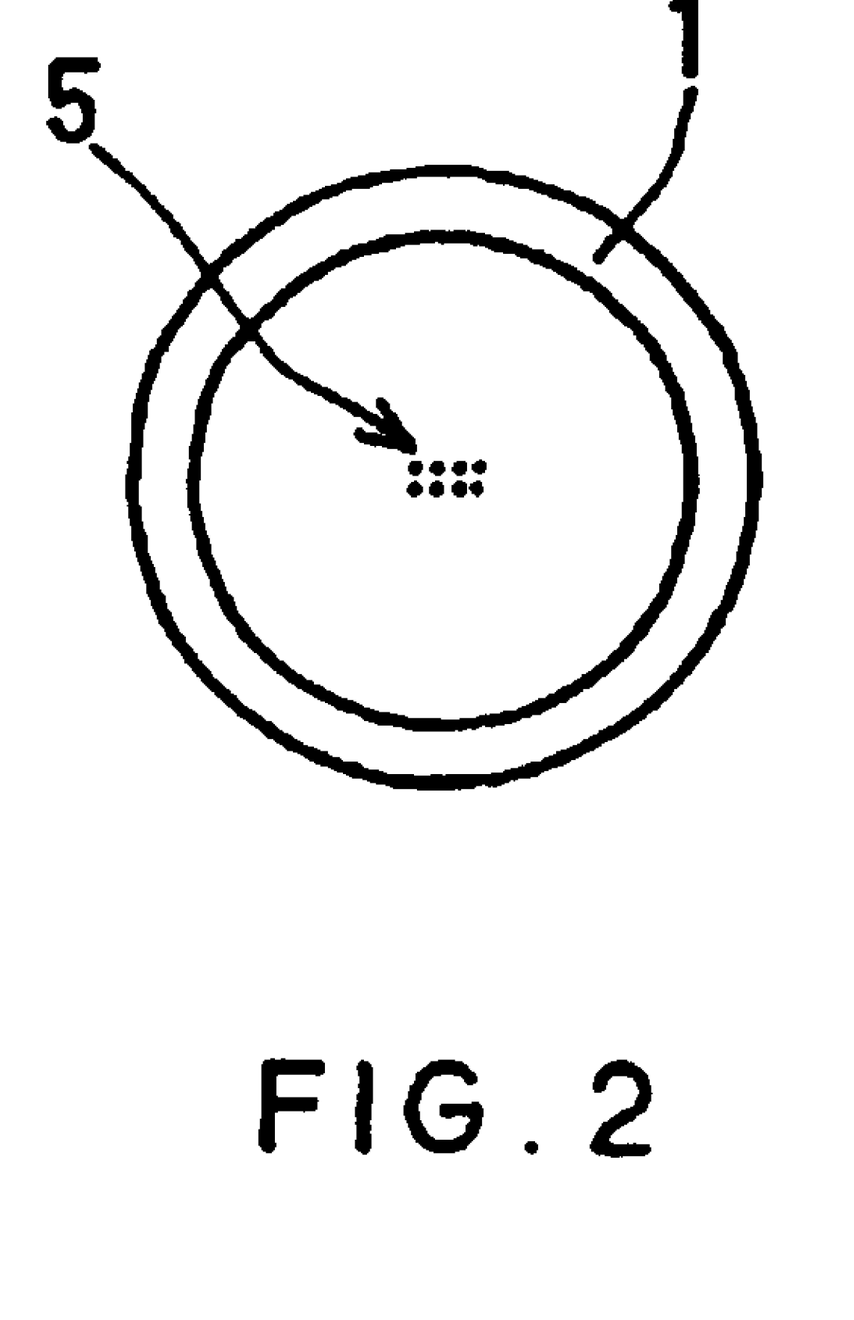
FIG. 2 is a top view of a glass substrate forming die of Embodiments 1 to 4 of the present invention.
Figure 3:
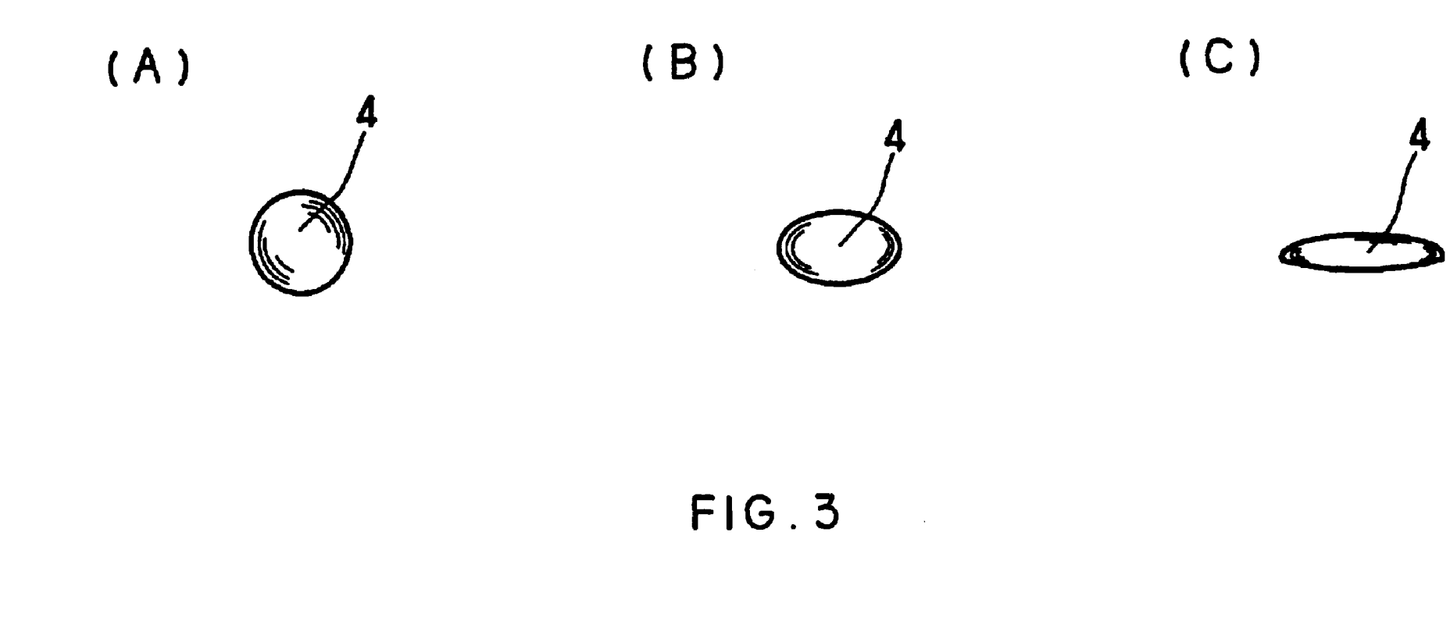
FIGS. 3(A), 3(B), and 3(C) are external views of a glass material to be molded into a glass substrate of the present invention.

In order to identify the die used, specifically, to distinguish the number of the die used, a plurality of concaves 5 are provided in the central portion of the upper die 1 and the lower die 2. FIG. 2 shows the upper die 1 provided with the concaves 5, which is viewed from the top.

When such a glass substrate forming die is used, the concaves 5 are transferred on both surfaces of a glass substrate so as to form convexes thereon after the glass substrate has been formed. Specifically, eight small concaves are arranged in a row in the central portion of a die, and 0 to 8 concaves are arranged in a row at the position corresponding to each of the eight concaves (under each of them) in various combinations that differ depending on the number of a die. This makes it possible to distinguish which die has been used for forming the glass substrate 19. In this case, there are 256 ways of combinations. Though this number is sufficient to distinguish a die, the arrangement of such concaves is not limited to eight, and the number of concaves as well as the method for arranging the concaves may be changed in accordance with use. In addition to identifying a die, the concaves are effective in improving releasability of a die and a glass substrate.

Each member of a glass substrate forming die is made of super-hard alloy ("IGETALLOY" (the trade name of Sumitomo Electric Industries, LTD.), binder-less series, linear thermal expansion coefficient $\alpha = 43 \times 10^{-7}$ (at room temperatures up to 400° C.)), whose main component is tungsten carbide (WC). The molding faces 1a and 2a are processed so as to have a desired surface roughness and covered with a platinum (Pt) based alloy protective layer.

FIGS. 3(A), 3(B), and 3(C) show an example of the shape of the glass material 4 to be molded into a glass substrate. There is no particular limitation to the shape of a glass material, as long as the glass material comes into point-contact with a die when initially placed therein, and the contact portion is enlarged continuously so as to prevent air from entering the contact portion between the glass material and the die during transformation of the glass material. Specifically, it is preferable that the vertical cross section of the glass material is circular or elliptical. As the type of glass, soda-lime glass (glass transition temperature Tg=539° C., linear thermal expansion coefficient $\alpha = 87 \times 10^{-7}$ (100~300° C.)) is used.

Figure 4:
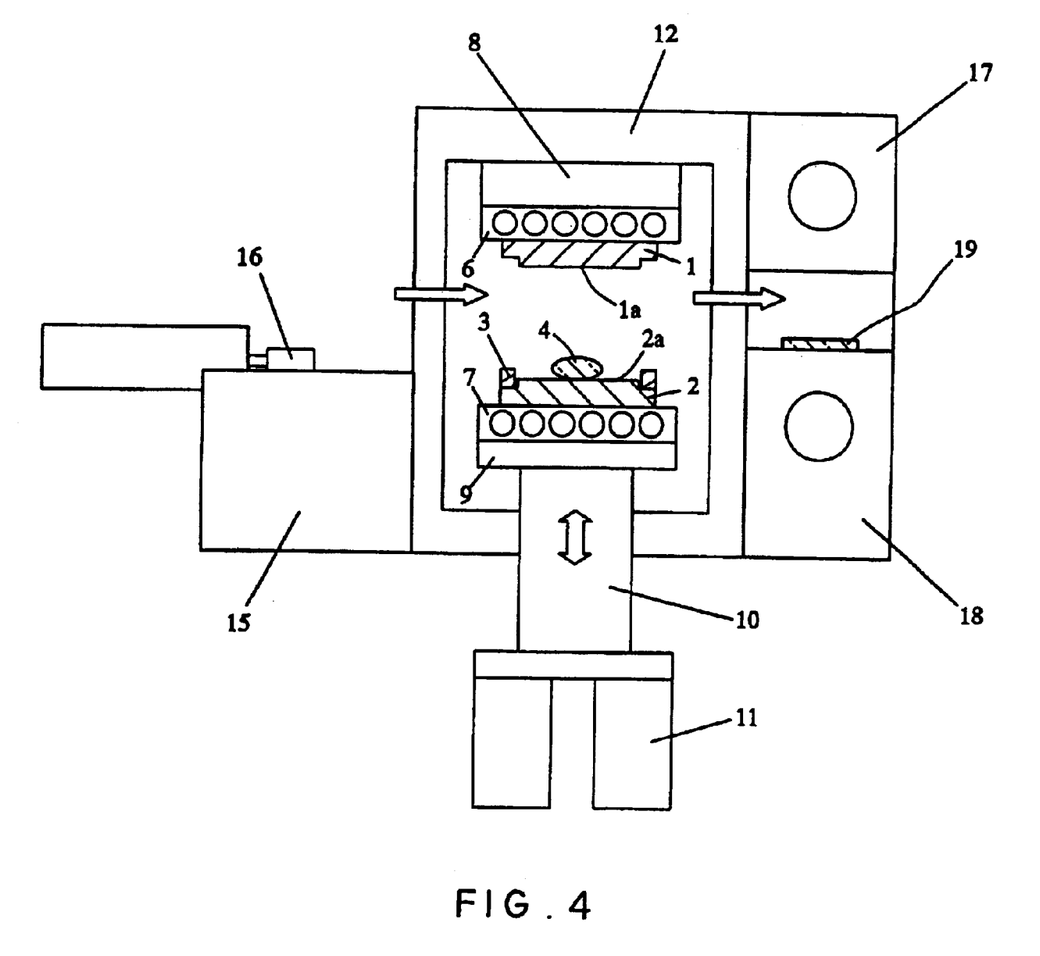
FIG. 4 is a cross-sectional view showing the outline of a molding apparatus for a glass substrate of Embodiments 1 and 2 of the present invention.

FIG. 4 is a cross-sectional view showing the outline of a molding apparatus for a glass substrate. The apparatus is provided for forming the glass substrate 19 illustrated in FIG. 6(C), using the glass substrate forming die illustrated in FIG. 1(A) and the material (having an outer diameter of 20 mm, a thickness of 7 mm, and a substantially elliptical cross section in the vertical direction) to be molded into a glass substrate, illustrated in FIG. 3(B).

The upper die 1 is fixed to a heater 6, and the heater 6 is fixed to a chamber 12 via a heat insulating plate 8. The lower die 2 is fixed to a heater 7, and the heater 7 is fixed on a cylinder rod 10 via a heat insulating plate 9. The cylinder rod 10 moves up and down by a cylinder 11. The ring-shaped control member 3 is mounted on a flange surface of the lower die 2 so that the space between the upper die 1 and the lower die 2 is 0.635 mm upon completion of molding.

Next, the molding process will be descried. A glass substrate to be manufactured according to Embodiment 1 of the present invention is a magnetic disk glass substrate having an outer diameter of 65 mm and a thickness of 0.635 mm.

First, the glass material 4 supplied to a stand 15 is conveyed by a chuck 16 for chucking a glass material from the outside of the chamber 12 to the inside thereof, and placed substantially in the center of the molding face 2a of the lower die in the chamber 12 that is filled with an $N_2$ atmosphere.

After the glass material 4 is placed, the lower die 2 is raised slowly by the cylinder 11. The power of the heaters 6, 7 is turned on when the glass material 4 is raised to come into contact with the molding face 1a of the upper die. The glass material 4 is heated at a temperature of 770° C. (the temperature at which glass viscosity is 7.1 poise) until the inside of the material has this temperature. The glass material 4 expands with heat and is transformed between the fixed upper and lower dies. At this time, the lower die 2 is held by applying a low load so as to prevent bubbles from entering.

After the glass material 4 is heated and softened to the inside, a high load is applied to the lower die 2 by the cylinder 11 so that the lower die 2 goes up, and thus the glass material 4 is molded by the pressure. The transformation of the glass material 4 is completed when the control member 3 touches the flange of the upper die 1.

At this time, the glass material 4 is molded to have a thickness of 0.635 mm that is the same as the space between the upper die 1 and the lower die 2 made by the control member 3.

When the transformation is completed, the power of the heaters 6, 7 is turned off, and the upper die 1, the lower die 2, the control member 3, and the glass material 4 are cooled while maintaining a high load. These elements may be cooled forcibly. In that case, however, the cooling has to be performed so that the temperature of the inner surface of the forming die is as uniform as possible.

Each of the upper die 1, the lower die 2, the control member 3, and the glass material 4 contracts during the cooling. Since the space between the upper die 1 and the lower die 2 is controlled by the control member 3, the amount of the space depends on the amount of contraction of the control member 3. The amount of thermal contraction of the glass material 4 is larger than that of the control member 3. Therefore, the glass material 4 can be released gradually from the upper and the lower die as the temperature falls.

A high load is applied to the glass substrate forming die by the cylinder 11 until the temperature of the glass material 4 is 539° C., which is a glass transition temperature, and then the high load is reduced to a lower load.

Thereafter, the temperature is lowered to about 300° C., and the lower die 2 goes down by the cylinder 11 to the initial position. The glass substrate 19, which has been in the forming die, is conveyed by a conveying pad (not shown) to be placed between an upper cooling heater 17 and a lower cooling heater 18 in the cooling process, and taken out of the molding apparatus after annealing, and thus molding is completed.

FIG. 6(C) shows an external view of the glass substrate 19 of this embodiment. The obtained glass substrate 19 to which the shape of the molding face of a die is substantially transferred has a super smooth surface with surface roughness of 1 nm. In addition, the degree of flatness of the glass substrate 19 is within 5 μm, and the substrate is free of waviness and has convexes 22 in the central portion to distinguish the number of a forming die.

In this embodiment, a plurality of concaves 5 for distinguishing the number of a die are provided in the central portions of the upper die 1 and the lower die 2. However, the concaves 5 may be provided in either the upper die 1 or the lower die 2. Moreover, the concaves 5 may not be necessary. In this case, the obtained glass substrate 19, as shown in FIG. 6(A), is the same glass substrate as in FIG. 6(C) except for the convexes 22.

Embodiment 2

Embodiment 2 of the present invention is the same as Embodiment 1 except that a material containing bubbles is used as a glass material 4 to be molded into a glass substrate. That is, molding the material containing bubbles results in a glass substrate 19 of the present invention containing bubbles 21, as shown in FIG. 6(B). This substrate has a specific gravity lower than that of the glass substrate 19 not containing bubbles 21 shown in FIG. 6(A) or 6(B), and thus it is useful for a magnetic disk glass substrate that is required high-speed rotation.

Embodiment 3

FIG. 1(B) is a cross-sectional view showing a glass substrate forming die of Embodiment 3 of the present invention, in which a glass material 4 to be molded into a glass substrate is placed.

The glass substrate forming die includes an upper die 1 having a molding face 1a for providing a glass substrate 19 (shown in FIG. 6) with a desired surface roughness, a lower die 2 having a molding face 2a for providing the glass substrate 19 with a desired surface roughness, and a control member 3 for controlling the space between the molding face 1a of the upper die 1 and the molding face 2a of the lower die 2 in completion of molding. The upper die 1 and the lower die 2 are arranged substantially on the same axis so as to face each other. In this case, the appropriate surface roughness (Ra) of the molding faces 1a and 2a is 5 nm or less for magnetic disks, preferably 2 nm or less, more preferably 1 nm or less.

The space varies depending on the thickness of a glass substrate to be formed. However, it is substantially the same as the thickness of a glass substrate, and about 1 mm at the maximum As with Embodiment 1, in order to identify the die used, a plurality of concaves 5 are provided in the central portion of the upper die 1 and the lower die 2. FIG. 2 shows the upper die 1 provided with the concaves, which is viewed from the top.

When such a glass substrate forming die is used, the concaves 5 are transferred on both surfaces of a glass substrate to form convexes thereon after the glass substrate has been formed. Specifically, as with Embodiment 1, eight small concaves are arranged in a row and concaves that vary depending on the number of a die are arranged under the eight concaves. This makes it possible to distinguish which die has been used for forming the glass substrate 19.

Each member of a glass substrate forming die is made of super-hard alloy ("IGETALLOY" (the trade name of Sumitomo Electric Industries, LTD.), binder-less series, linear thermal expansion coefficient $\alpha=43\times10^{-7}$ (at room temperatures up to 400° C.)), whose main component is tungsten carbide (WC). The molding faces 1a and 2a are processed so as to have a desired surface roughness and covered with a platinum (Pt) based alloy protective layer.

Figure 5:
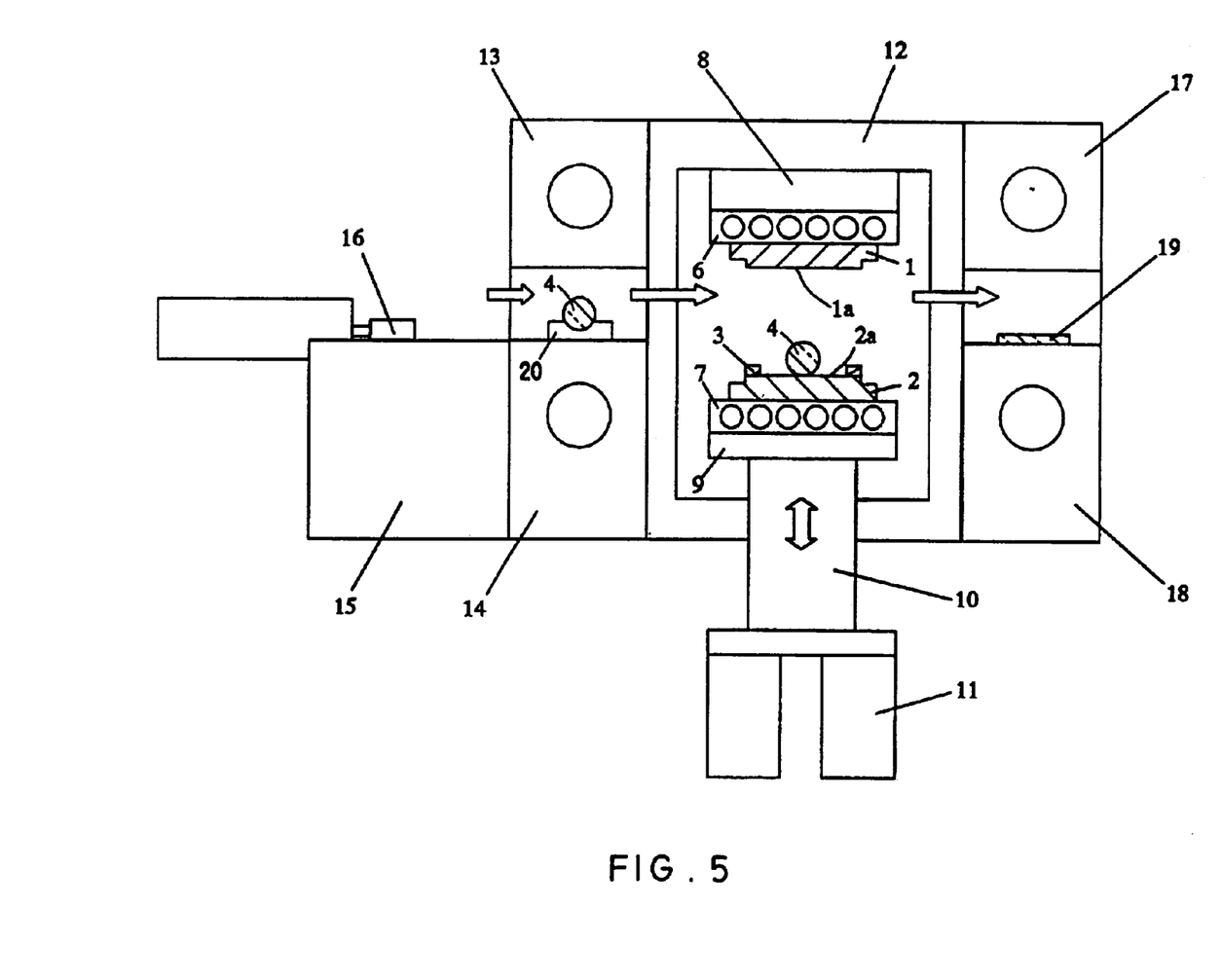
FIG. 5 is a cross-sectional view showing the outline of a molding apparatus for a glass substrate of Embodiments 3 and 4 of the present invention.
Figure 6:
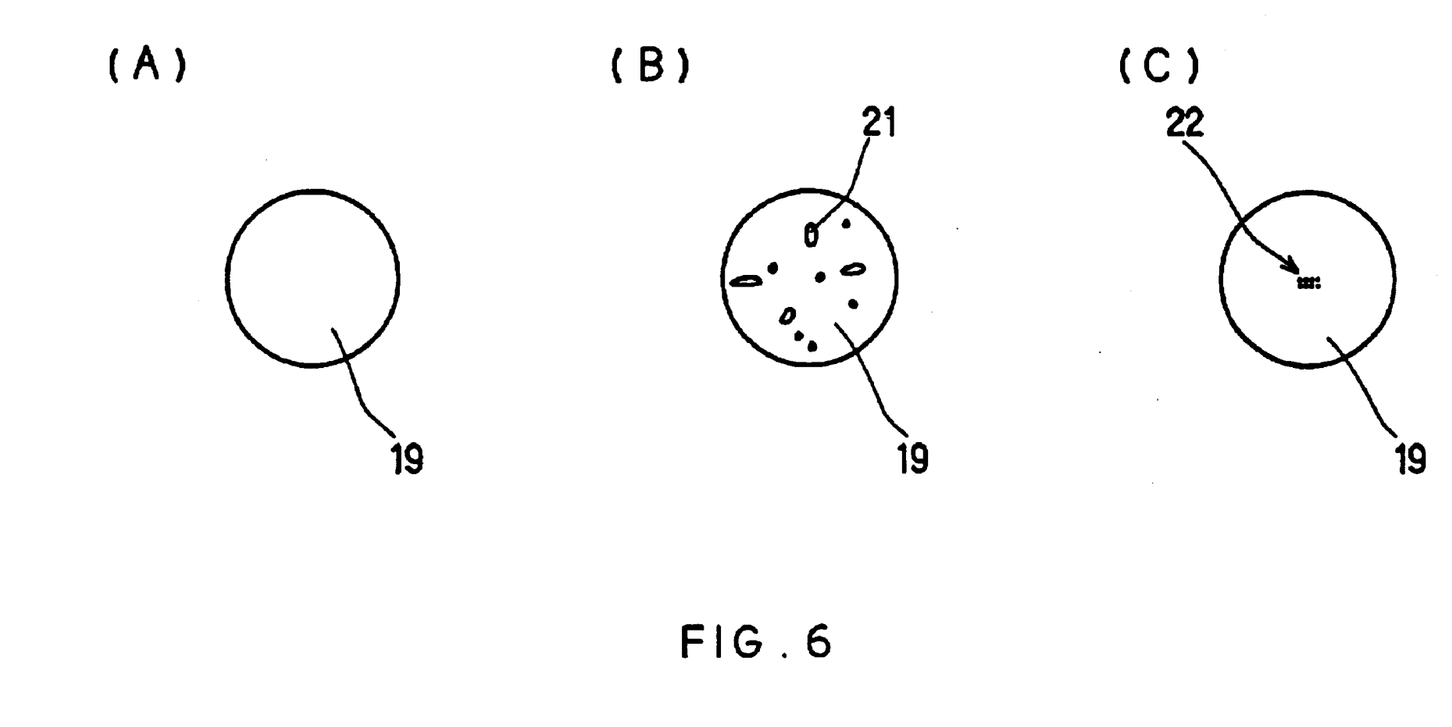
FIGS. 6(A), 6(B), and 6(C) are external views of a glass substrate of the present invention.

FIG. 5 is a cross-sectional view showing the outline of a molding apparatus for a glass substrate. The apparatus is provided for forming the glass substrate 19 illustrated in FIG. 6(C), using the glass substrate forming die illustrated in FIG. 1(B) and the material (a sphere having a diameter of 22.1 mm) to be molded into a glass substrate, illustrated in FIG. 3(A).

A saucer 20 for carrying a glass material used in the processes of placing, heating, and softening the glass material 4 is made of materials that have good releasability from the glass material 4 at high temperature, e.g., carbide such as SiC or TiC, carbon, and nitride such as AlN or TiN, etc. Alternatively, these materials are applied to the surface of the saucer 20 by various kinds of film forming techniques such as CVD or the like so that the surface is finished to be a desired surface roughness.

The type of glass material used is alumino silicate glass (glass transition temperature Tg=492° C., linear thermal expansion coefficient $\alpha=95\times10^{-7}$ (100~300° C.)). The glass material having the shape shown in FIG. 3(A) also comes into point-contact with a die when initially placed therein, and the contact portion is enlarged continuously so as to prevent air from entering the contact portion between the glass material and the die during transformation of the glass material.

The upper die 1 is fixed to a heater 6, and the heater 6 is fixed to a chamber 12 via a heat insulating plate 8. The lower die 2 is fixed to a heater 7, and the heater 7 is fixed on a cylinder rod 10 via a heat insulating plate 9. The cylinder rod 10 moves up and down by a cylinder 11. The ring-shaped control member is mounted on the molding face 2a of the lower die 2 so that the space between the upper die 1 and the lower die 2 is 0.8 mm upon completion of molding.

Next, the molding process will be described. A glass substrate to be manufactured according to Embodiment 3 of the present invention is a magnetic disk glass substrate having an outer diameter of 95 mm and a thickness of 0.8 mm.

First, the glass material 4 supplied to the saucer 20 on a stand 15 is conveyed by a chuck 16 for chucking a glass material to be placed between an upper pre-heater 13 and a lower pre-heater 14. The space where the glass material is placed is filled with an $N_2$ atmosphere. Here, the glass material 4 is heated at a temperature of 750° C. (the temperature at which glass viscosity is 6.4 poise) until the inside of the material has this temperature (a heating and softening process).

After heating, the glass material 4 is conveyed again by the chuck 16 to the inside of the chamber 12 between the upper die 1 and the lower die 2 while placed on the saucer 20. Then only the glass material 4 is chucked by a transfer unit (not shown) and placed substantially in the center of the molding face 2a of the lower die 2 after the chuck 16 and the saucer 20 have been withdrawn.

After the glass material is placed, pressure is supplied immediately to the cylinder 11 so that the lower die 2 is raised to apply a high load to the glass material, and thus the glass material is molded by the pressure. The transformation of the glass material is completed when the control member 3 on the molding face 2a of the lower die 2 touches the molding face 1a of the upper die.

At this time, the glass material 4 is molded to have a thickness of 0.8 mm that is the same as the space between the upper die 1 and the lower die 2 made by the control member 3.

The temperature of each of the upper die 1 and the lower die 2 is set to 600° C. by the respective heaters 6, 7. Since the transformed glass material 4 has a smaller thickness of 0.8 mm, it is cooled immediately to this temperature.

When the transformation is completed, the power of the heaters 6, 7 is turned off, and the upper die 1, the lower die 2, the control member 3, and the glass material 4 are cooled while maintaining a high load. These elements may be cooled forcibly. In that case, however, the cooling has to be performed so that the temperature of the inner surface of the forming die is as uniform as possible.

Each of the upper die 1, the lower die 2, the control member 3, and the glass material 4 contracts during the cooling. Since the space between the upper die 1 and the lower die 2 is controlled by the control member 3, the amount of the space depends on the amount of contraction of the control member 3. The amount of thermal contraction of the glass material 4 is larger than that of the control member 3. Therefore, the glass material 4 can be released gradually from the upper and the lower die as the temperature falls.

A high load is applied to the glass substrate forming die by the cylinder 11 until the temperature of the glass material 4 is 492° C., which is a glass transition temperature, and then the high load is reduced to a lower load.

Thereafter, the temperature is lowered to about 300° C., and the lower die 2 goes down by the cylinder 11 to the initial position. The glass substrate 19, which has been in the forming die, is conveyed by a conveying pad (not shown) to be placed between an upper cooling heater 17 and a lower cooling heater 18 in the cooling process, and taken out of the molding apparatus after annealing, and thus molding is completed.

FIG. 6(C) shows an external view of the glass substrate 19 of this embodiment. The obtained glass substrate 19 to which the shape of the molding face of a die is substantially transferred has a super smooth surface with surface roughness of 0.6 nm. In addition, the degree of flatness of the glass substrate 19 is within 5 μm, and the substrate is free of waviness and has convexes 22 in the central portion to distinguish the number of a forming die.

In this embodiment, a plurality of concaves 5 for distinguishing the number of a die are provided in the central portion of the upper die 1 and the lower die 2. However, the concaves 5 may be provided in either the upper die 1 or the lower die 2. Moreover, the concaves 5 may not be necessary. In this case, the obtained glass substrate 19, as shown in FIG. 6(A), is the same glass substrate as in FIG. 6(C) except for the convexes 22.

Embodiment 4

In this embodiment, a magnetic disk glass substrate having an outer diameter of 95 mm and a thickness of 0.8 mm is manufactured in the same manner as in Embodiment 3 except that a glass material 4 is heated at a temperature of 700° C. (the temperature at which glass viscosity is 7.1 poise) by an upper pre-heater 13 and a lower pre-heater 14, and an upper die 1 and a lower die 2 are heated at a temperature of 700° C. by heaters 6, 7 in molding.

The external shape of the obtained glass substrate 19 is shown in FIG. 6(C). The glass substrate 19 to which the shape of the molding face of a die substantially is transferred has a super smooth surface with surface roughness of 0.6 nm. In addition, the degree of flatness of the glass substrate 19 is within 5 μm, and the substrate is free of waviness and has convexes 22 in the central portion to distinguish the number of a forming die.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A glass forming die for molding a glass substrate into a shape of a parallel plate comprising:

a pair of upper and lower dies;

a glass material disposed between the upper and lower dies, the glass material having a shape that provides a point-contact with the upper and lower dies when placed therein, and as a contact portion between the glass material and the upper and lower dies is increased by pressure molding, the glass material is transformed continuously so as to prevent air from entering the contact portion; and a control member for controlling a space between the upper and the lower dies;

wherein the glass material has a coefficient of thermal expansion larger than that of the control member.

2. The glass forming die according to claim 1, wherein a relationship between an outer diameter X and a thickness Y of the glass material satisfies X>40 Y.

3. The glass forming die according to claim 1, wherein a vertical cross section of the glass material is circular or elliptical.

* * * * *